Oct. 25, 1966  D. C. HINGS  3,280,904
HEAT EXCHANGE VESSELS
Filed April 28, 1964  2 Sheets-Sheet 2
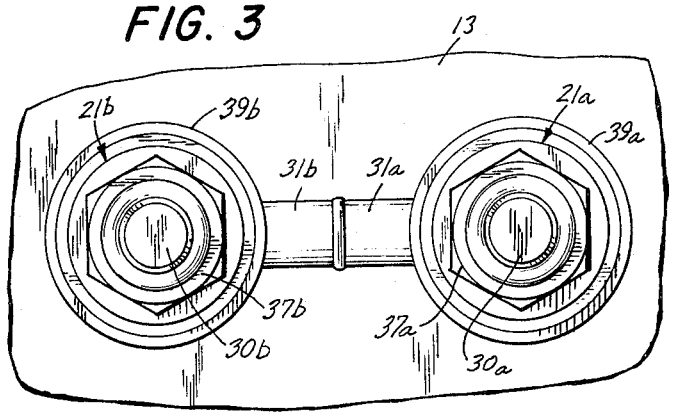
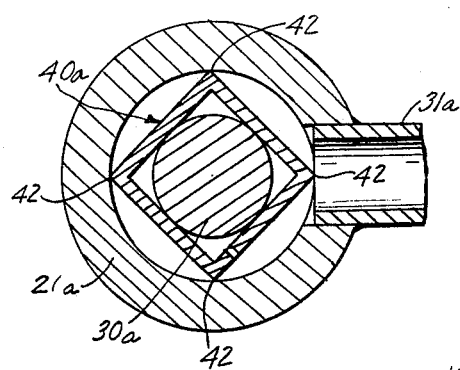
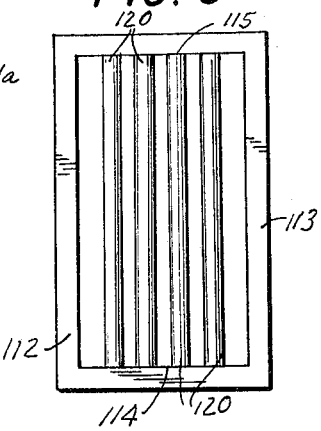
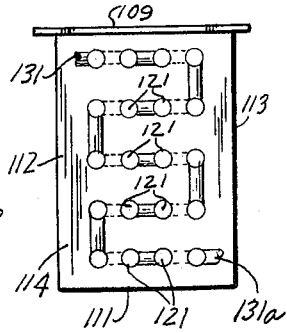
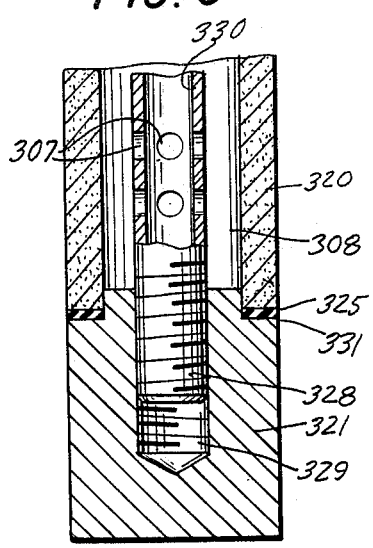
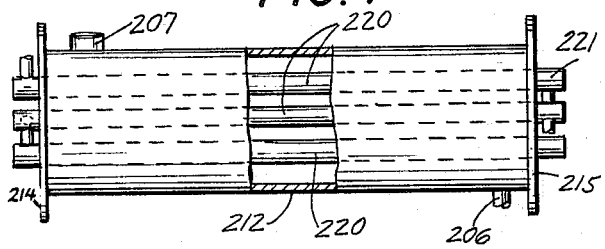
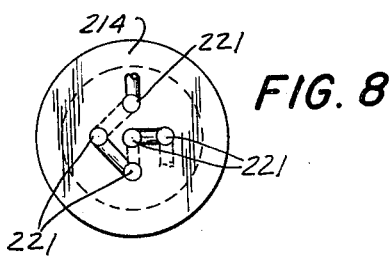

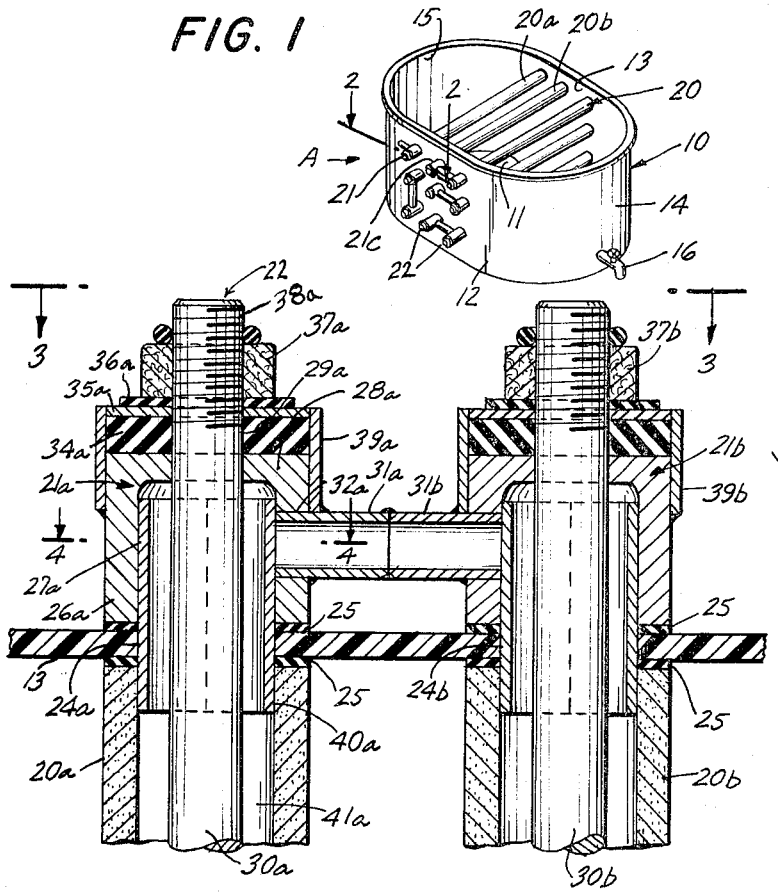
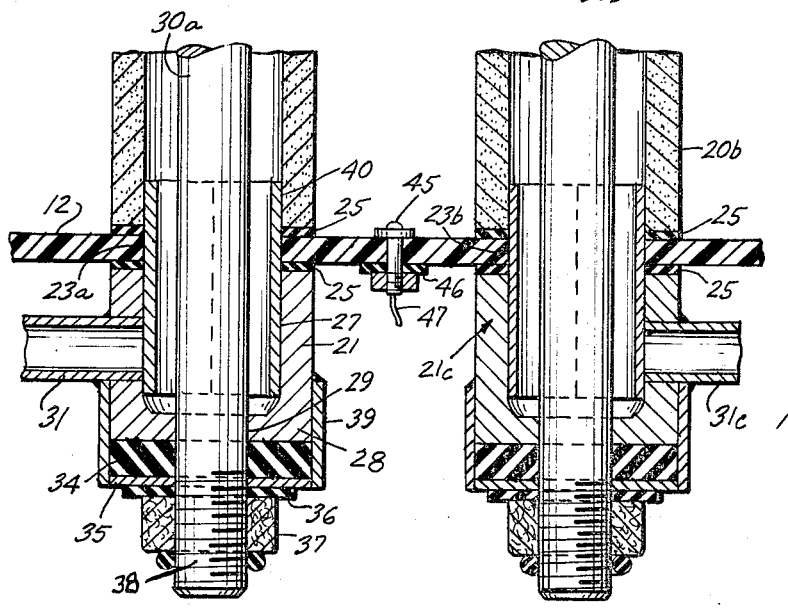

United States Patent Office 3,280,904
Patented Oct. 25, 1966

3,280,904
HEAT EXCHANGE VESSEL
David Cooper Hings, Barking, Essex, England, assignor, by mesne assignments, to Whitmoyer Laboratories, Inc., a corporation of Delaware
Filed Apr. 28, 1964, Ser. No. 363,180
Claims priority, application Great Britain, May 8, 1963, 18,259/63
6 Claims. (Cl. 165—143)

This invention relates to vessels for heat exchange and more particularly to vessels in which chemical reactions may be carried out while the reagents are heated or cooled or which may be used as attemperating vessels and condensers.

It is an object of the invention to provide vessels for heat exchange in which liquid or vapor to be subjected to heat exchange is corrosive.

Corrosion-resistant vessels and the like, heretofore have been conventionally fabricated from stainless steel, or from metal which has been lined with glass, rubber, or other like corrosion resistant coating or lining material. Construction of heat-exchange reaction vessels from stainless steel involves a relatively high capital expenditure, and the use of glass vessels, or heat exchange vessels made of less expensive metal lined with glass or corrosive resistant protective coatings, are likely to be poor heat conductors thus reducing the efficiency of the heat-exchange between the heat exchange fluid or medium and the reaction liquid or vapor.

According to the present invention, there is provided a heat-exchange vessel comprising a substantially rigid body part formed of corrosion-resistant synthetic resin or plastic having one or more pairs of holes formed in opposite walls thereof, one or more graphite tubes disposed wholly within said body part and in engagement with the inner surfaces of the walls of said body part in register with the holes in oppositely disposed walls of the body part, the ends of each of the graphite tubes being maintained in fluid-tight engagement with the inner surfaces of oppositely disposed walls of the body part by means of hollow end cap members disposed outside said body part in register with oppositely disposed holes, connected together by a tie bar under tension and extending through the graphite tube in registry with said oppositely disposed holes to clamp the wall of the body part between the ends of said tube and its registering cap member; the cap members being formed with a connection for the passage of heat exchange fluid therethrough. Preferably the cap members are made of inexpensive steel because of its strength and since the heat-exchange fluid which passes through the graphite tube will ordinarily be non-corrosive and the cap members do not come in contact with the reagents in the body part of the vessel, it is unnecessary to use expensive corrosion resistant steel for the cap members.

Preferably, the tie bar is tensioned by means of a threaded nut engaging the screw-threaded end of the tie bar which extends through the hollow cap members, the nut bearing upon an outer surface of the cap member, preferably through the intermediary of a resilient washer.

It will be understood that a heat-exchange vessel embodying the invention will be provided with any necessary inlet and outlet conduits, depending upon the purpose to which it is applied.

Although the novel features which are believed to be characteristic of the invention are pointed out in the annexed claims, the invention itself as to its objects and advantages and the manner in which it may be carried out, may be better understood by reference to the following more detailed description, taken in connection with the accompanying drawings, forming a part hereof, in which:

FIG. 1 is a view in perspective showing one form of reaction vessel embodying the invention;

FIG. 2 is a view in section, broken away and to larger scale showing details of the manner of mounting and connecting the graphite tubes in the body part of the reaction vessel;

FIG. 3 is a view in elevation taken on line 3—3 of FIG. 2;

FIG. 4 is a view in section taken on line 4—4 of FIG. 2;

FIG. 5 is a plan view somewhat diagrammatic to illustrate an enclosed or cascade heat exchange vessel;

FIG. 6 is an end view in elevation of the heat exchange vessel shown in FIG. 5;

FIG. 7 is a view in elevation and partly in section showing another form to illustrate a cylindrical condenser;

FIG. 8 is an end view of the vessel shown in FIG. 7; and

FIG. 9 is a partial view in section of a further modification showing a single ended mounting of a graphite tube.

Referring now to the drawings, in which like reference characters indicate like parts throughout the several views, FIG. 1 shows a reaction vessel A which, in general, comprises a body part 10 having a bottom wall 11 and a vertical wall having oppositely disposed parallel side walls 12, 13 and curved end walls 14, 15. A valved conduit 16 may be provided as a draw off to empty the vessel, if desired. The bottom wall and vertical wall may be constructed of corrosion resistant plastic or synthetic resin material and, as shown, is thermoplastic polypropylene which was initially in sheet form. It has been found that polypropylene in sheet form may be readily formed to desired shape and joints may be welded and a sufficiently rigid body may be thus fabricated, yet the material is sufficiently flexible that special expansion joints are not necessary. The body part made of polypropylene is corrosive resistant and can be made of polypropylene to withstand temperatures of reagents therein heated to 120° C. and even higher. Moreover, polypropylene may be made in sheet form which is translucent and therefore the level of contents in the body part of a heat exchange vessel made of such material may be discerned through the walls of the vessel.

Mounted within the body part 10 of the vessel are a plurality of graphite tubes mounted in parallel relation and connected in series in such fashion as to provide a continuous serpentinous passageway through the inlet end of one of the tubes, as a first tube in series to the outlet end of the last of the graphite tubes connected in series. The graphite tubes, designated generally by reference numeral 20, are each of a length extending from front wall 12 to rear wall 13. They are maintained in place by means of hollow return bend cap members and tension rods, designated generally by reference numerals 21 and 22, respectively. For convenience of description sub-letters are used with the reference numerals to designate particular cap members, graphite tubes and tension rods. This system is used also in designating other similar parts. The opposed walls 12, 13 of the body part 10 are provided with pairs of oppositely disposed axially aligned apertures 23a–24a for each graphite tube.

Inasmuch as each of the graphite tubes is mounted in the body part in the same manner, it will suffice to describe, as typical, two of them with their cap members and tie rods which are shown by way of example in FIGS. 2–4. Graphite tube 20a is mounted in axial alignment with apertures 23a, 24a. A sealing gasket 25 of corrosive resistant, resilient, elastomer material, such as rubber or neoprene, is clamped between one end of the graphite tube 20a and wall 12 and a similar gasket is clamped between the other end of the same tube and the oppositely disposed wall 13.

Referring particularly to FIG. 2, a typical cap member 21a, which forms a return bend whose hollow portion changes the direction of flow of fluid therein 180° comprises a hollow cup shaped body portion having an open end cylindrical portion 26a having an axial bore 27a therein of the same diameter as graphite tube 20a. The outer end wall 28a of the cap member has an axially aligned bore 29a of small diameter than bore 27a through which extends the tie rod 30a. A hollow side arm conduit 31a extends into a bore 32a in the cylindrical wall 26a at right angles thereto. The hollow shaped member 21a and hollow side arm 31a may be made of metal, such as steel. The cap member 21 on the outside of wall 12 is of the same construction as cap member 21a on the outside of wall 13; it being noted, however, that the cap member is positioned so that side arm 31, extends in the opposite direction. The tie rod 30a which, as shown, is steel, extends through bores 29 and 29a of the oppositely disposed cap members 21, 21a. In some instances tie rods made of copper or alloys thereof are preferable. A sealing gasket 25 is clamped between the inner ends of the cap member 21, 21a and the walls 12 and 13, respectively. Resilient annular pads 34, 34a of fiber, or rubber, or other similar resilient material are mounted on each end of the rod 30 in contact with the end walls 28, 28a of the cap members. Metal washers 35, 35a are mounted on the tie rod at each end together with a fiber washer 36, 36a. Threaded clamping nuts 37, 37a of self-locking type are screwed on to the threaded ends 38, 38a of the tie rod. Cylindrically shaped metal retaining rings 39, 39a mounted over the cylindrical walls of the cap members are useful in maintaining the resilient pads 34, 34a in properly aligned position.

Centralizing members 40, 40a are mounted on the tie rod 30a within the passageway 41a provided by the graphite tube and the bores 27, 27a of the cap members. These centralizing members are preferably made of non-rusting thin spring steel plate. They are formed to have a square cross-section (see FIGS. 2 and 4) and to provide a split, hollow, and square columnar snap-on piece, which may be snapped on to the tie rod with gripping force. The dimensions are such that the outside corners 42, of the centralizer member frictionally engage the interior surface of the graphite tube 20a and bore 27a in the cap member. The centralizer members facilitate assembly. In exchangers wherein the graphite tubes are unusually long, a number of these centralizer members may be placed at intervals along the tie rod 30a and they serve also to strengthen the assembled structure.

It will be understood that the graphite tube 20b (FIG. 2) is mounted in the same way as graphite tube 20a. The same reference numerals indicate like parts, sub-letters being used to designate particular members. It will be seen that the side arm conduit 31b of cap member 21b is joined to the side arm conduit 31a of cap member 21a. Hence, passageway is provided through the inlet side arm conduit 31 through the cap member 21, through cap member 21a, through side arm conduits 31a, 31b thence through the cap member 21b, graphite tube 20b through cap member 21c and side arm conduit 31c which may be joined to the next adjacent cap member, so as to connect as many graphite tubes in series in the body part 10 of the heat exchange vessel as may be required. The graphite tubes may also be connected in parallel. Further, in one modification of the invention a group preferably containing two or four graphite tubes connected in series may be connected in parallel with one or more similar groups of graphite tubes connected in series. The outlet from a single graphite tube or from the last of the graphite tubes of a group connected in series may be connected via the cap member directly to a fluid heat exchange medium receiver or when single graphite tubes or series-connected groups of graphite tubes are connected in parallel all such outlets may lead into a single outlet tube which may then be connected to a fluid heat exchange medium receiver. In the same way the inlets may be connected either directly or through a common inlet tube to a source of heat exchange medium to be forced through the passageway provided by the tubes and cap members.

It will be seen from the foregoing description that the continuous passageway through the graphite tubes and hollow cap members, may be made fluid tight at all joints where the parts are in contact with the walls, 12, 13 by placing sufficient tension on the tie bars 30 by means of the threaded lock nuts 37 to squeeze the gaskets 25 so that the connections will not leak. The side arm conduits may be joined by the simple expedient of welding.

In order to carry away static electrical charges that may be generated because of movement of solids or liquids against the surfaces of the plastic walls or other parts of the vessel, there is provided a metal electrode 45 which may extend through and in contact with the wall of the vessel. As shown, the electrode 45 is of tantalum which is highly corrosion resistant and it may be bolted to the wall by means of a threaded nut 46 screwed on the outer threaded end of the electrode. A conductor cable 47 secured to the electrode is connected to the earth to ground the electrode. This is particularly useful in eliminating the hazards of possible explosion when volatile explosive vapors may be evolved in reactions carried out in the heat exchange vessel.

Briefly stated the operation of the heat exchange vessel is as follows: The reagents or other material that is to be heated or cooled or reacted, is charged into the body part of the heat exchange evessel and the heat exchange medium, which may be heated or cooled water or other liquid or gaseous heat exchange medium is passed through the serpentinous passageway provided by the graphite tubes and cap members; the graphite tubes having very good thermal conductivity.

A modified form of heat exchange vessel embodying the invention is shown in FIGS. 5 and 6 which illustrate more or less diagrammatically a covered heat exchanger vessel. The body part of the vessel comprises vertical front and rear walls 112, 113; vertical end walls 114, 115, bottom wall 111 and top, or cover, wall 109 constructed of polypropylene initially in sheet form to form a rectangular box shaped body; the joints being welded. The graphite tubes 120 are mounted in parallel fashion in the body part and are connected in series, in parallel or in series-connected groups connected in parallel in the same way as described in connection with FIGS. 1 to 4. The graphite tubes 120 extend from the interior surface of end wall 114 to the interior surface of end wall 115 and are aligned with axially aligned holes in the end walls. The passageways of the tubes are connected by means of cap members 121 on the outside surfaces of the end walls of the body part. These cap members are like the typical cap members 21 described hereinbefore. Tie members like tie member 30a of FIG. 2 under tension are employed in the same manner to maintain leak tight connections.

A cylindrical condenser embodying the invention is diagrammatically illustrated in FIGS. 7 and 8. It comprises a cylindrical shell, consisting of cylindrical wall 212 having an inlet conduit 206 and outlet conduit 207 and end walls 214, 215 constructed of sheet form polypropylene. A number of graphite tubes 220 like graphite tubes 20a of FIG. 1 are mounted in the cylindrical shell. These graphite tubes are connected by cap members 221 like cap members 21a of FIG. 1 on the outside of end walls 214, 215 to provide a serpentinous passageway for heat exchange medium through the graphite tubes.

A modified form of heat exchanger tube arrangement is shown in FIG. 9. In this embodiment a hollow metal pipe 330 is used inside the graphite tube 320, the outer end of the pipe forming a connection for the heat exchange medium which passes through the pipe in one direction through holes 307 in the inner end of the pipe, thence the heat exchange medium passes in the opposite direction in the annular space 308 between the exterior of the tie-rod pipe 330 and the graphite tube 320. The end of the graphite tube is closed by a polypropylene cap member 321 having a threaded blind bore 329 which is threaded on to the threaded end 328 of the tie-rod pipe. A resilient rubber, or neoprene, gasket 325 between the annular shoulder 331 on the cap 321 and the end of the pipe may be squeezed therebetween to form a fluid tight seal, by maintaining the tie-rod pipe 330 under tension. This type of mounting may also be used as a protective sheath for a thermometer or similar instrument, the stem being inserted in the hollow tie-pipe.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A heat exchanger vessel which comprises a substantially rigid hollow casing body part formed of synthetic plastic material and having a pair of oppositely disposed walls in parallel planes providing a first and a second wall, a plurality of pairs of oppositely disposed wall apertures, the first of each pair of apertures being in the first wall of said pair of walls and the second of each pair of apertures being in the second of said pair of walls, each of said pairs of apertures being in axial alignment, a graphite tube having a fluid passageway therethrough and having a first end and a second end mounted in said casing for each pair of oppositely disposed axially aligned apertures and mounted in axial alignment therewith, with the first end of said tube abutting the inside surface of said first wall in an annular area surrounding the first of that pair of aligned apertures but not extending through said first wall and with the second end of said tube abutting the inside surface of said second wall in an area surrounding the second of that pair of aligned apertures but not extending through said second wall, a plurality of hollow cap members mounted on and having an end abutting the outside surface of said first wall and a plurality of hollow cap members mounted on and having an end abutting the outside surface of said second wall, each of said cap members having at least two apertures in registry with two wall apertures, providing fluid passageway through each of said hollow cap members, each cap member mounted on said first wall being mounted with an end portion abutting the outside surface of said first wall in an area surrounding an aperture in said first wall and with another end portion abutting the outside surface of said first wall in an area surrounding an adjacent aperture in said first wall and each cap member mounted on said second wall being mounted with an end portion abutting the outside surface of said second wall in an area surrounding an aperture in said second wall and with another end portion abutting the outside surface of said second wall in an area surrounding an adjacent aperture in said second wall, a tie rod extending axially through each graphite tube and through the first and second of the pair of apertures with which that graphite tube is aligned, each of said tie rods having a first end portion extending through a hollow portion of a cap member on said first wall with an end portion exposed on the outside of that cap member and having a second end portion extending through a hollow portion of a cap member on said second wall with an end portion exposed on the outside of that cap member, adjustable tightening means on each exposed end portion of each tie rod and a resilient pad mounted on each exposed end portion of each tie rod between its tightening means and its connected cap member, said tightening means when tightened on said rods putting said tie rods under tension and clamping said walls between the ends of the graphite tubes and said hollow cap members to provide fluid tight passageway for heat exchange fluid passing through said tubes and hollow cap members and means for supplying another heat exchange fluid to the interior of said casing in the space outside of said tubes and for removing said heat exchange fluid from said space.

2. A heat exchanger vessel which comprises a substantially rigid hollow casing body part formed of synthetic plastic material and having a pair of oppositely disposed walls in parallel planes providing a first and a second wall, a plurality of pairs of oppositely disposed wall apertures, the first of each pair of apertures being in the first wall of said pair of walls and the second of each pair of apertures being in the second of said pair of walls, each of said pairs of apertures being in axial alignment, a graphite tube having a fluid passageway therethrough and having a first end and a second end mounted in said casing for each pair of oppositely disposed axially aligned apertures and mounted in axial alignment therewith, with the first end of said tube abutting the inside surface of said first wall in an annular area surrounding the first of that pair of aligned apertures but not extending through said first wall and with the second end of said tube abutting the inside surface of said second wall in an area surrounding the second of that pair of aligned apertures but not extending through said second wall, a plurality of return bend cap members mounted on the outside surface of said first wall and a plurality of return bend cap members mounted on the outside surface of said second wall, each of said return bend cap members comprising a first cylindrical hollow portion and a second cylindrical hollow portion and a hollow arm portion connecting said first and second cylindrical portions providing fluid passageway through each of said return bend cap members, each return bend cap member mounted on said first wall being mounted with one of its cylindrical portions abutting the outside surface of said first wall in an area surrounding an aperture in said first wall and with the other of its cylindrical portions abutting the outside surface of said first wall in an area surrounding an adjacent aperture in said first wall and each return bend cap member mounted on said second wall being mounted with one of its cylindrical portions abutting the outside surface of said second wall in an area surrounding an aperture in said second wall and with the other of its cylindrical portions abutting the outside surface of said second wall in an area surrounding an adjacent aperture in said second wall, a tie rod extending axially through each graphite tube and through the first and second of the pair of apertures with which that graphite tube is aligned, each of said tie rods having a first end portion extending through a cylindrical portion of a return cap member on said first wall with an end portion exposed on the outside of that return bend cap member and having a second end portion extending through a cylindrical portion of a return bend cap member on said second wall with an end portion exposed on the outside of that return bend cap member, movable adjustable tightening means on each exposed end portion of each tie rod and a resilient pad mounted on each exposed end portion of each tie rod between its tightening means and the return bend cap member, said tightening means when tightened on said rods putting said tie rods under tension and clamping said walls between the ends of the graphite tubes and said return bend cap members to provide fluid tight passageway for a first heat exchange fluid passing through said tubes and return bend cap members and conduit means for supplying a second heat exchange fluid to the interior of said casing in the space outside of said tubes and for removing said second heat exchange fluid from said space.

3. A heat exchanger vessel according to claim 2 in which said body part is constructed of polypropylene.

4. A heat exchanger vessel according to claim 3 in which the exposed end portions of said tie rods are threaded and a threaded nut on each of said threaded end portions serves as tightening means to put said tie rods under tension.

5. A heat exchanger vessel according to claim 4 in which the body part is constructed of polypropylene in sheet form shaped to form said body part, and said hollow cap members and tie rods are constructed of steel.

6. A heat exchanger vessel according to claim 5 in which hollow snap-on centralizer members made of spring plate metal are mounted on said tie rods with interior surface portions of the centralizer members engaging the tie rod and exterior surface portions of the centralizer members engaging the interior surfaces of the graphite tubes.

References Cited by the Examiner

UNITED STATES PATENTS

| 2,713,996 | 7/1955 | Pottharst | 285—137 X |
| 2,887,303 | 5/1959 | Reys | 165—180 |

OTHER REFERENCES

German printed application S 42,651, Seffert, March 1956.

ROBERT A. O'LEARY, *Primary Examiner.*

CHARLES SUKALO, *Examiner.*

T. W. STREULE, *Assistant Examiner.*